E. H. FISHER.
BRINELL HARDNESS TESTING MACHINE.
APPLICATION FILED DEC. 19, 1917.
1,320,748.
Patented Nov. 4, 1919.
2 SHEETS—SHEET 1.
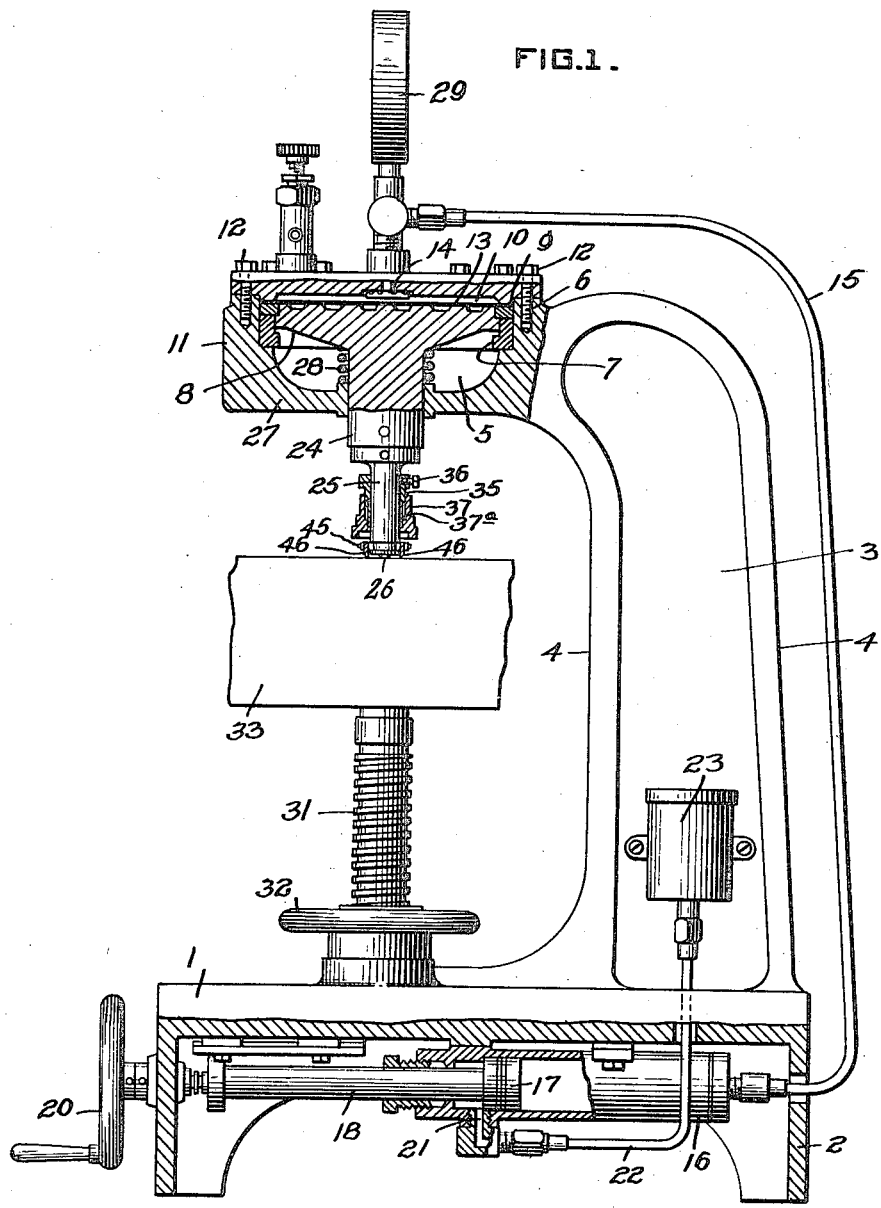

E. H. FISHER.
BRINELL HARDNESS TESTING MACHINE.
APPLICATION FILED DEC. 19, 1917.
1,320,748.
Patented Nov. 4, 1919.
2 SHEETS—SHEET 2.
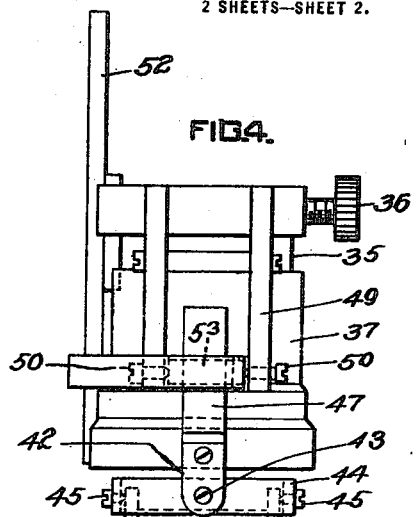
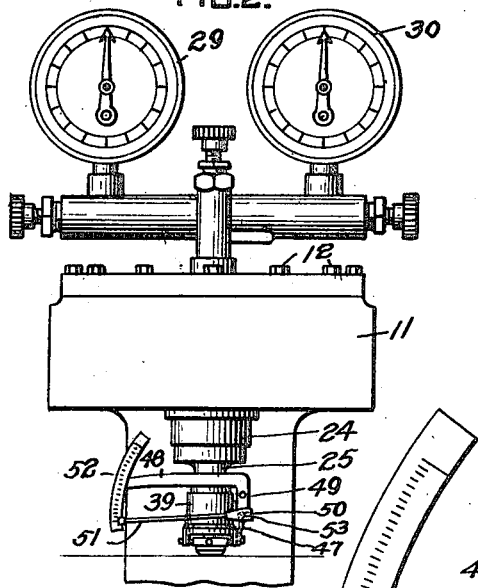
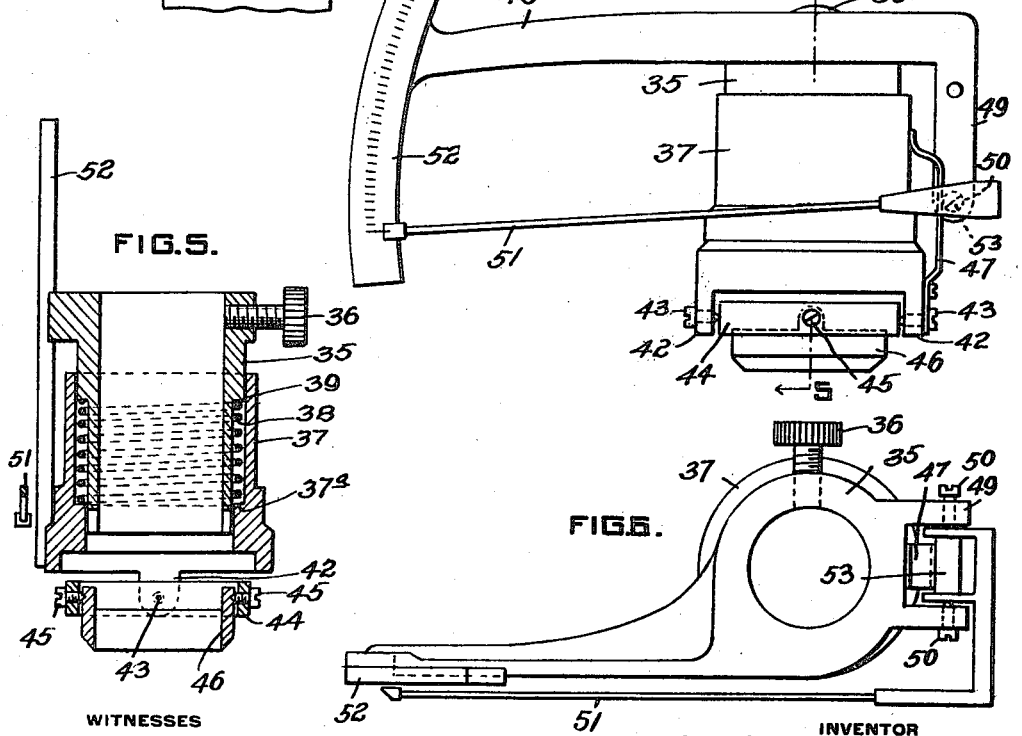
WITNESSES
J. Herbert Bradley
INVENTOR
Edwin H. Fisher
by Jo. Baily Brown
his Attorney

UNITED STATES PATENT OFFICE.

EDWIN H. FISHER, OF PITTSBURGH, PENNSYLVANIA, ASSIGNOR TO SCIENTIFIC MATERIALS COMPANY, A CORPORATION OF PENNSYLVANIA.

BRINELL HARDNESS-TESTING MACHINE.

1,320,748.      Specification of Letters Patent.      Patented Nov. 4, 1919.

Application filed December 19, 1917. Serial No. 207,923.

*To all whom it may concern:*

Be it known that I, EDWIN H. FISHER, a resident of Pittsburgh, in the county of Allegheny and State of Pennsylvania, have invented a new and useful Improvement in Brinell Hardness-Testing Machines, of which the following is a specification.

This invention relates to Brinell testing machines, for measuring the hardness of metals.

The objects of the invention include means for applying a constant and non-pulsating pressure by a hydraulic press to a sphere to force it into a specimen being tested; means to prevent drawing of air bubbles into the fluid medium of pressure transmission; a more effective seal about the head of a main pressure piston; means to measure depth of indentation of the specimen by the sphere and to instantly and directly register the depth on a visible scale; and means to determine the elasticity of a specimen as affecting the depth test. Other objects will appear and be apparent. They include constructional features rendering the tests more certainly accurate and designed to avoid errors incident to previously used machines of this class.

Referring to the drawings, Figure 1 is a side elevation and partial vertical section of the complete machine, with the indicating means attached thereto, and a specimen in place to be tested.

Fig. 2 is a partial front elevation of the machine and its gages and the depth measuring scale in place.

Fig. 3 is an enlarged side elevation of the particular device used to measure the travel of the testing ball into the specimen.

Fig. 4 is a side elevation of the construction shown in Fig. 3.

Fig. 5 is a central vertical section on the line 5—5 of Fig. 3; and

Fig. 6 is a plan view of the measuring device and scale, as shown in Fig. 3.

The Brinell method of testing hardness consists in pressing a hardened steel sphere, which will not deform, into the surface of metal to be tested, and then measuring the diameter or depth of the indentation so produced by a definite pressure. The amount of travel of a ball of certain size into the specimen, in a given time, under a certain pressure, determines the hardness thereof, and is expressed in certain standard units. It was for a long time the ordinary method to measure the diameter of the indentation, but more accurate results are obtained from direct measurements of the depth of indentation in the test piece rather than the diameter, since the metal tends to flow unevenly with varying conditions. The present invention contemplates the application of a special device for measuring this travel of the test ball into the specimen. It also contemplates an improved form of hydraulic press for applying pressure to the testing ball.

The means employed in the present machine for applying pressure to the specimen comprise a hydraulic press having a heavy base 1, carried by suitable supports 2, and itself carrying an upwardly extending arm or neck 3, composed of a central web and bounding flanges 4, and having at its upper end a lateral extending portion including a chamber 5. This chamber has a central bore in which is mounted a cylindrical lining member 6, having a limiting shoulder 7, thus forming a short cylinder, in which a piston 8 is mounted. The piston is free to travel for a short distance up and down, being limited in its downward travel by shoulder 7, and in its upward travel by an inserted ring 9. The top of chamber 5 is closed by a metal plate 10, attached to the main casing 11 by bolts 12. Between the ring 9 and plate 10 is clamped a flexible rubber diaphragm 13. The plate 10 has a central opening 14, connected by pipe 15 to a cylinder 16, mounted beneath the base 1. In this cylinder a tightly packed piston 17 is mounted to move from end to end thereof. This piston carries a hollow shaft 18, into which is threaded a screw 19, having a terminal hand wheel 20. The turning of the latter forces the piston backward and forward in the cylinder 16 in obvious manner. Leading into the cylinder 16, near its closed end, is a port 21 connected to a pipe 22, leading upward to a reservoir 23.

The piston 8 has a downwardly extending central shaft 24, integral therewith, and this shaft is formed at its lower end into a spindle of reduced size, 25, in the end of which is rigidly mounted a sphere 26, of hardened steel. Between the bottom of the piston 8 and the lower wall 27 of chamber 5 is mounted a coil spring 28, of sufficient strength to normally counter-balance the weight of the piston. Suitably connected to the pipe 15 and passage 14, are fluid pressure gages 29 and 30.

In the base 1, axially alined with spindle 25, is a lifting screw 31, operated by a hand wheel 32.

The operation of this press for the Brinell hardness test is as follows:

A specimen 33, the hardness of which is to be measured, is placed upon the top of screw 31, and this is moved upward until the specimen is brought into firm contact with the ball 26. By turning hand wheel 20, a fluid which fills the cylinder 16, pipe 15 and the space above the diaphragm 13, is forced into the space above the piston 8, and by the familiar principle of the hydraulic press, is multiplied according to the comparative areas of the two pistons, so that a very great pressure upon the large piston 8 is generated by a comparatively small amount of power applied to the small piston 17. This forces the ball 26 into the specimen, and by applying a fixed pressure, and recording the time during which the pressure is applied, the indentation of the ball on the specimen furnishes a way to express the hardness of the metal in standard terms.

It will be observed that in the press here shown, there is no opportunity for the fluid by which the pressure is transmitted, a liquid of low compression, such as glycerin, to leak through packings about the main piston. Behind the small piston 17 liquid from reservoir 23 is supplied so that there is no opportunity for air to be drawn into the compression chamber. When air does get into this chamber, it destroys the constancy of the pressure applied. That is, it supplies an undesirable cushioning element, where incompressibility is the object. The diaphragm 13 does away with the necessity of packing the piston 8. It may be of soft rubber.

This method of forcing liquid to the main pressure chamber permits the use of any desired speed, is constant in application under control of the operator, and avoids the pulsating or hammer like effect of the pumps which are ordinarily used for this purpose.

In order to measure directly the amount of travel of sphere 26 into the specimen 33, the device illustrated in Figs. 2 to 6 is provided. It consists of a metal sleeve 35, adapted to slip over the spindle 25, and carries a set screw 36 by which it is securely clamped to the spindle 25. A concentric outer sleeve 37 is mounted over the sleeve 35, having an internal shoulder 37ª, adapted to form a seat for a coil spring 38, the upper end of which bears on an internal shoulder 39 on sleeve 35. At the lower end of the sleeve 37 are two projecting arms 42 through which are mounted bearing screws 43, the ends of which make pivotal diametrically opposite engagement with a metal ring 44, through which at diametrically opposite points, midway between the position of screws 43, are bearing screws 45, having their ends extended inward to make pivotal engagement with a ring 46. This arrangement of parts forms a universal joint, so that the ring 46 can seat upon any flat surface. The joints formed by screws 43 and 45 though pivotal, are otherwise tight, so that there is no lost motion vertically in in this arrangement.

Attached to the outside of sleeve 37 is a spring 47. Rigidly mounted upon the sleeve 35 is a cross arm 48, having a downward fork extension 49, which carries at its lower end a pointer 51, extending to a graduated dial member 52 at the other end of cross bar 48. The downwardly extending fork 49 carries screw 50 forming a bearing for a circular roller 53, to which is rigidly attached the pointer 51. Thus the spring member 47 constantly bears under pressure against the roller 53, forming a rolling frictional contact therewith. Therefore, when the arm 49 which is integral with sleeve 35, is moved downward relative to sleeve 37, the spindle 53 rolls upon the spring 47, and the free end of pointer 51 is moved upward on the scale 52.

In practice this measuring device is rigidly clamped by the set screw 36 on the spindle 25, the specimen 33 is moved upward into contact with the ball 26, as above described. The small coil spring 38 normally forces the outer sleeve 37 downward, and by means of the universal joint arrangement above described, the ring 46 seats on the upper surface of the specimen 33. When these adjustments have been made, the pointer 51 is moved to zero reading. This is done by simply moving the pointer to the desired place, since it has merely a frictional engagement with the moving member 47, and this easy adjustment to zero is an important feature.

Then by turning hand wheel 20, the operator applies pressure to the piston 8, and consequently forces the hardened steel ball 26 into the upper surface of specimen 33. As the spindle 25, carrying the ball 26, moves downward, the sleeve 35 moves with it, the sleeve 37 being held in place by the upper surface of the specimen, and there is a relative telescoping movement of the two sleeves 35 and 37, causing the spindle 53 to be rolled downward upon the spring contact member 47 exactly the same distance that the hardened sphere is forced into the metal. The pointer is actuated in obvious manner and indicates in one hundredths of a millimeter the travel of the ball into the specimen.

An important feature of this device is that the reading is accurate regardless of any bending of the main body of the press. The reading being determined entirely by relative movement of the two concentric sleeves.

Furthermore, any elasticity of the specimen does not render the test inaccurate, as in the diameter measuring method. It is obvious that the reading here is based entirely on the actual travel of the test ball into the metal. If the elasticity is to be determined also, this may be readily calculated by releasing pressure after the depth test, and observing the distance the ball is forced outward by elasticity of the metal. This will be indicated directly on the scale.

Other advantages not specifically set forth herein will be apparent to those familiar with this art.

I claim:

1. In a Brinell hardness testing machine comprising a hydraulic press with a main cylinder and piston therein for forcing a hardened steel sphere into a test specimen, the hardness of which is being determined, a small cylinder adapted to be filled with fluid and connected from one end to the main cylinder of the hydraulic press, a piston in the smaller cylinder, a hand wheel and screw adapted to actuate the piston in its smaller cylinder, a port leading into said smaller cylinder at the closed end thereof and a connection from said port to a liquid containing reservoir, whereby to maintain the smaller cylinder filled with liquid upon each side of the piston therein.

2. A Brinell hardness testing machine comprising a specimen support, a hydraulically operated piston adapted to force a hardened steel sphere into a test specimen the hardness of which is to be determined, in combination with a device for measuring the travel of said sphere into the specimen, said measuring device comprising an interior sleeve clamped upon the sphere-carrying spindle of the hydraulically driven piston, an exterior sleeve bearing at its lower end upon the surface of the specimen being tested, and means for measuring directly the relative movement of said sleeves as the sphere is forced into the surface of the specimen.

3. In a Brinell testing machine, a device for measuring the penetration of a spherical member into the surface of a specimen of material, the hardness of which is being determined, comprising a sleeve adapted to be clamped upon the sphere-carrying part of the machine, an exterior sleeve slidably mounted upon the first mentioned sleeve and bearing upon the surface of the specimen being tested, and a pointer operated by relative movement of the two sleeves and adapted to indicate upon a scale the travel of the said sphere into the specimen being tested.

4. In combination with a Brinell testing machine comprising a hydraulically operated spindle having a sphere adapted to be pressed into the surface of a specimen, the hardness of which is being tested, a device for measuring the penetration of the sphere into the specimen, comprising a removable sleeve adapted to be clamped to the sphere-carrying spindle, a second sleeve mounted outside the first mentioned sleeve and slidable thereon, a depending arm on one of the sleeves carrying a rotatable member having attached thereto a pointer, said pointer being adapted to coöperate with a scale carried by the clamped sleeve, and a member fixed on the sleeve and engaging the rotatable member, whereby the relative movement of the two sleeves actuates the pointer to indicate the amount of such relative travel upon the scale.

In testimony whereof, I have hereunto set my hand.

EDWIN H. FISHER.

Witness:
Jo. Baily Brown.